Feb. 2, 1932.  J. F. O'CONNOR  1,843,729
FRICTION SHOCK ABSORBING MECHANISM
Filed Feb. 25, 1929
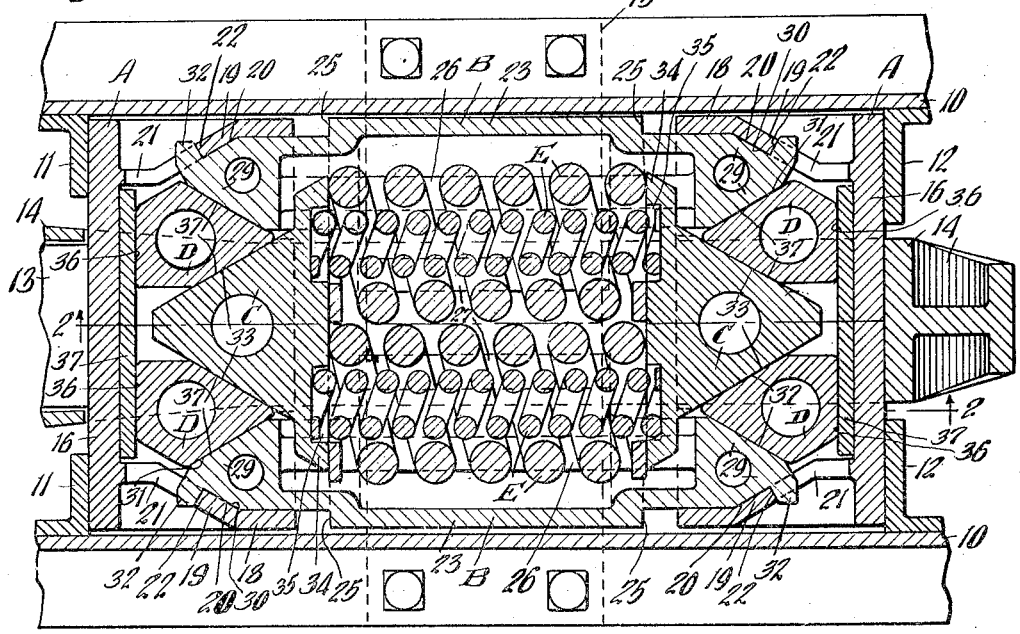
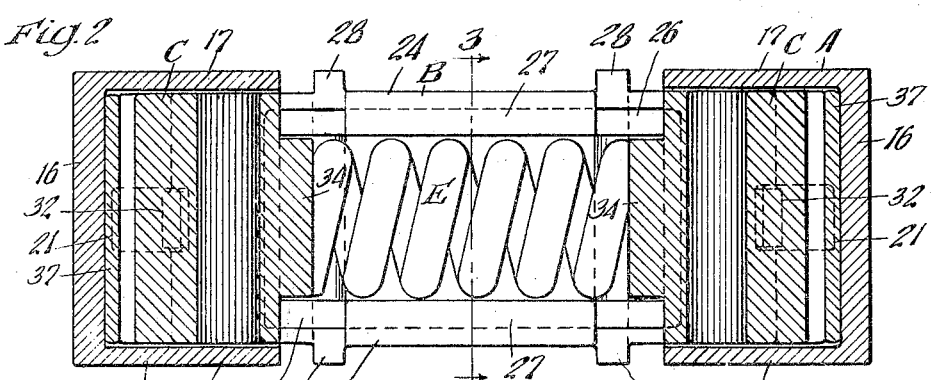
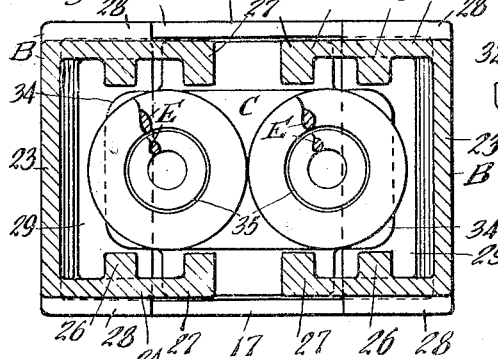
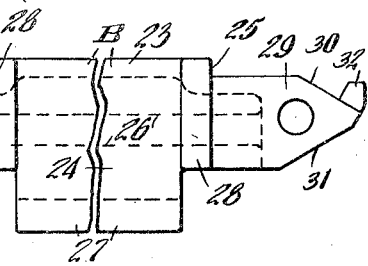
Inventor
John F. O'Connor
By Joseph Harris
His Atty.
Witness
Wm. Geiger Patented Feb. 2, 1932

1,843,729

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed February 25, 1929. Serial No. 342,426.

This invention relates to improvements in friction shock absorbing mechanisms.

One object of the invention is to provide a friction shock absorbing mechanism, especially adapted for railway draft riggings, including relatively movable end followers, friction wedge means at opposite ends of the mechanism cooperating with the followers, spring resistance means interposed between the friction wedge means, together with means for maintaining the parts assembled, including column means having shouldered engagement with the followers.

A further object of the invention is to provide a friction shock absorbing mechanism, including end follower casings having interior opposed wedge faces, column members having wedge faces at opposite ends thereof in wedging engagement with the wedge faces of the follower casings, two pairs of wedge blocks at opposite ends of the mechanism having frictional contact with the followers and wedging engagement with the column members, a central wedge block at each end of the mechanism having wedging engagement with the corresponding pair of friction wedge blocks, and a main spring resistance interposed between the central wedge blocks, wherein the mechanism is held of over-all uniform length by lugs at opposite ends of the column anchored to the follower casings and having shouldered engagement therewith to limit outward separation of the casing and maintain over-all uniform length of the mechanism.

Other and further objects of the invention will more clearly appear from the description and claims hereinafter following.

In the drawings forming a part of this specification, Figure 1 is a horizontal, longitudinal sectional view of a portion of the underframe structure of a railway car at one end of the car, illustrating my improvements in connection therewith. Figure 2 is a longitudinal, vertical sectional view, corresponding substantially to the line 2—2 of Figure 1, with the coupler shank and yoke omitted. Figure 3 is a vertical, transverse sectional view, corresponding substantially to the line 3—3 of Figure 2. And Figure 4 is a top plan view, on a reduced scale, of a column member employed in connection with my improved shock absorbing mechanism.

In said drawings, 10—10 indicate spaced channel-shaped center or draft sills of a railway car underframe, to the inner sides of which are secured front stop lugs 11—11 and rear stop lugs 12—12. The inner end portion of the coupler shank is designated by 13 and has operatively connected thereto a hooded yoke 14 of well known form. My improved shock absorbing mechanism is disposed within the yoke and the yoke in turn is supported by a detachable saddle plate 15 secured to the draft sills.

My improved shock absorbing mechanism comprises, broadly, a pair of follower casings A—A, two combined wedge and anchoring column members B—B, a pair of wedge blocks C—C, two pairs of friction wedge blocks or shoes D—D, and twin main spring resistance elements E—E.

The end follower casings A are of similar design, each casing having a relatively heavy vertical transverse end wall 16 cooperating with the corresponding stop lugs of the draft sills. Each casing is also provided with spaced top and bottom walls 17—17 and spaced side walls 18—18. As most clearly shown in Figure 1, the side walls have straight sections at the inner ends of the casing and inwardly diverging sections 19—19 between the straight sections and the end walls 16. The wall sections 19 are provided with interior wedge faces 20—20. As shown, each wall section 19 is slotted, as indicated at 21, for a purpose hereinafter pointed out, the inner end wall of each slot forming a limiting or retaining shoulder 22.

The combined wedge and anchoring column members B—B are disposed at opposite sides of the mechanism and are of similar design. Each member B has the main body portion thereof formed by a longitudinally extending vertical side wall 23 and top and bottom walls 24—24. At opposite ends, the side wall is inwardly offset with respect to the side wall portion of the main body, thereby providing abutment shoulders 25—25 at opposite ends of each member B. The top and bottom walls are preferably reinforced by longitudinally extending interior ribs 26—26, most clearly shown in Figure 3. The top and bottom walls 24 have laterally inwardly extending central portions 27—27 which extend laterally beyond the main body portion of the column member B. The top and bottom walls are also provided with exterior transverse abutment ribs 28—28 adjacent opposite ends of the column member, having their end edges in alignment with the abutment shoulders 25 so that the same, together with the shoulders 25, will form stop means.

The front and rear ends of each column member is provided with solid portions 29—29 having outwardly converging wedge faces 30 and 31 on opposite sides thereof, the wedge faces 30 cooperating with the wedge faces 20—20 of the front and rear followers at the same side of the mechanism. Each portion 29 is also provided with a laterally projecting retaining lug 32 at the extreme end thereof which engages within the corresponding slot or opening 21 of the follower casing A at the same end of the mechanism. As will be evident when the follower casings A are separated lengthwise of the mechanism to the extent shown in Figure 1, the lugs 32 at the opposite ends of the column members B will engage the shoulders 22 of the follower casings A, thereby limiting the separation of the casings and holding the entire mechanism assembled.

The central wedge blocks C are disposed at opposite ends of the mechanism and are of similar design. Each block C has outwardly converging wedge faces 33—33 on opposite sides thereof which cooperate with the friction wedge blocks D, as hereinafter pointed out. At the inner ends, the blocks C are laterally enlarged, as indicated at 34—34 to provide integral follower sections.

The main spring resistance E, which comprises twin arranged members each including an inner and an outer coil, is interposed between the blocks C, the outer coils of the springs being seated on the inner end faces of the blocks and the follower sections thereof, and the inner coils having their opposite ends extending into pockets 35—35 provided on the inner sides of the blocks C.

The friction wedge blocks D, which are four in number, are arranged in pairs at opposite ends of the mechanism, being arranged on opposite sides of the central wedge block C between the latter and the column members B. The blocks D are all of similar design, each having a flat front end friction face 36 engaging a wear plate 37 bearing on the inner side of the end wall 16 of the corresponding follower casing A. At the inner end, each block D is provided with inwardly converging wedge faces 37—37 on the opposite sides thereof, cooperating respectively with the corresponding wedge face 33 of the block C and the wedge face 31 of the column member B at the same side of the mechanism.

The spring resistance elements are housed within the column members B and are supported between the inwardly extending wall portions 24—24 at the top and bottom sides of said members.

In the normal full release position of the parts, the laterally extended portions 34 of the wedge blocks C are spaced inwardly from the inner ends of the solid sections 29 of the column members B, thereby compensating for wear of the various friction and wedge surfaces, the main spring resistance elements E being under initial compression, thereby constantly urging the wedge blocks C outwardly and keeping all of the wedge and friction surfaces in intimate contact. It is also pointed out that the outer ends of the wedge blocks C are spaced from the wear plates 37 of the follower casings so as to permit the necessary outward creeping of these blocks to compensate for wear.

The operation of my improved shock absorbing mechanism during a compression stroke is as follows: The follower casings A will be moved inwardly toward each other lengthwise of the mechanism, thereby forcing the friction wedge blocks D inwardly also, setting up a wedging action between the latter, the central wedge blocks C, and the wedge faces of the column members B. Due to the wedging action thus produced, the wedge faces of the column members will also be wedged tightly against the wedge faces of the casings A. Inasmuch as the column members are rigid, the inward movement of the follower casings A toward each other will cause the members B to be wedged laterally inwardly, thereby forcing the friction wedge blocks at each end of the mechanism laterally inwardly toward each other on the friction surfaces of the wear plates 37. Due to this action, the wedge blocks C will be squeezed from between the blocks D compressing the main spring resistance elements E. As will be evident, friction is thus created between the end followers, the blocks D and between all of the wedge faces of the blocks D, C, the column members B and the casings A. The compression of the main spring resistance elements E will exceed the travel of the follower casings toward each other, due to the differential action between the wedge elements of the mechanism. Inward approach of the follower casings will be limited by engagement of the inner ends of the casings with the shoulders 25 and the ribs 28 of the members B, thereby relieving the main spring resistance elements E from undue compression.

When the actuating force is reduced, in release of the mechanism, the expansive action of the springs E will force the blocks C outwardly, carrying the blocks D therewith and wedging the same apart, thereby forcing the casings apart and also spreading the members B laterally to maintain engagement of the wedge faces thereof with the wedge faces of the casings and hold the retaining lugs 32 seated in the guide slots 21. Outward separation of the casings will be limited by the lugs 32 at the opposite ends of the members B coming into engagement with the stop shoulders 22 of the casings. In addition to limiting the outward movement of the casings A, retaining means of the members B maintain the uniform over-all length of the mechanism and hold all the parts assembled.

In assembling my improved shock absorbing mechanism, the pairs of friction wedge blocks D are first placed within the casings A; the column members B, spring resistance elements E, and wedge blocks C are then assembled and the follower casings A with the wedge friction blocks D therein telescoped over the ends of the assembled members B and C. The wedge portions of the members C will thus be entered between the wedge blocks of the pairs D and the wedge means at the opposite ends of the members B will be entered between the wedge faces of the blocks D and the wedge faces of the casings A. The parts are placed under considerable compression lengthwise so as to force the lugs 32 at the opposite ends of the members B inwardly along the wedge faces of the casings A until they enter the slots 21 of the side walls of the casings.

As will be evident, the lugs 32 are thus snapped into the slots into cooperating relation with the stop shoulders 32 at the inner ends of the slots. The mechanism is thus completely assembled and the lugs of the column members engaging the shoulders 22 positively limit outward separation of the casings A and maintain the mechanism of uniform over-all length. When it is desired to dismember the mechanism lateral inward pressure is applied to both of the column members B, thereby forcing the same toward each other and disengaging the lugs 32 from the retaining shoulders or stop faces 22 permitting the main spring resistance to force the casings apart. All of the elements of the mechanism may then be removed.

While I have herein shown and described what I consider tthe preferred manner of carrying out my invention, the same is merely illustrative and I contemplate all changes and modifications which come within the scope of the claims appended hereto.

I claim:

1. In a friction shock absorbing mechanism, the combination with end follower casings having interior opposed wedge faces; of wedge members cooperating with the wedge faces of each follower casing, the wedge members being held against separation lengthwise of the mechanism, said wedge members having shouldered engagement with the followers to limit separation thereof lengthwise of the mechanism and hold the mechanism assembled; friction wedge blocks having wedging engagement with the wedge members and frictional engagement with the follower casings; a central wedge block at each end of the mechanism having wedging engagement with the friction wedge blocks; and a main spring resistance interposed between the central wedge blocks.

2. In a friction shock absorbing mechanism, the combination with front and rear follower casings having interior opposed wedge faces; of a pair of column members disposed at opposite sides of the mechanism and having wedge means at opposite ends thereof engaging the wedge faces at the corresponding sides of the front and rear follower casings, said column members having shouldered engagement with both follower casings to limit outward movement thereof and hold the mechanism assembled; wedge friction means at each end of the mechanism including a plurality of cooperating wedge friction elements interposed between said column members and having wedging engagement with each other, certain of said elements of each friction means having wedging engagement with both of said column members; and a spring resistance interposed between the follower casings and opposing relative movement of the friction wedge means at opposite ends of the mechanism.

3. In a friction shock absorbing mechanism, the combination with end followers; of column members disposed at opposite sides of the mechanism having shouldered engagement with the followers to limit outward movement thereof and hold the mechanism assembled, said column members and followers having cooperating wedge faces; central wedge blocks disposed at opposite ends of the mechanism; wedge friction blocks at each end of the mechanism at opposite sides of the central wedge blocks and having wedging engagement therewith and with the column members, and frictional engagement with the end followers; and spring resistance means interposed between said central wedge blocks.

4. In a friction shock absorbing mechanism, the combination with end follower casings relatively movable toward and away from each other, said follower casings having interior, opposed wedge faces; of column members disposed at opposite sides of the mechanism, each column member having outwardly converging wedge faces at opposite ends thereof, one of the wedge faces at each end of the column cooperating with the wedge face of the casing at the corresponding side of the mechanism, said column members and casings having cooperating anchoring means thereon for limiting outward movement of the casings and holding the mechanism assembled; a pair of friction wedge blocks at each end of the casing, having frictional engagement with the corresponding follower casing and wedging engagement with the column members at the corresponding end of the mechanism; central wedge members at opposite ends of the mechanism having wedging engagement with the friction wedge members; and a main spring resistance interposed between said central wedge members and yieldingly opposing inward movement of the same.

5. In a friction shock absorbing mechanism the combination with relatively movable end followers; of column members anchored to the followers to limit outward separation thereof, one of said followers having wedging engagement with the column members; friction wedge shoes having frictional engagement with the last named follower and wedging engagement with said column members; a wedge member having wedging engagement with said friction wedge shoes; and spring resistance means between the followers and opposing inward movement of said wedge members.

In witness that I claim the foregoing I have hereunto subscribed my name this 21st day of February, 1929.

JOHN F. O'CONNOR.